United States Patent [19]
Farrington

[11] Patent Number: 6,136,088
[45] Date of Patent: *Oct. 24, 2000

[54] RAPID SETTING, HIGH EARLY STRENGTH BINDERS

[75] Inventor: Stephen A. Farrington, Chardon, Ohio

[73] Assignee: MBT Holding AG, Zurich, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/946,744

[22] Filed: Oct. 9, 1997

[51] Int. Cl.$^7$ ............ C04B 12/02; C04B 28/30; C04B 28/34
[52] U.S. Cl. ............ 106/691; 106/690
[58] Field of Search ............ 106/690, 691

[56] References Cited

U.S. PATENT DOCUMENTS

| | | | |
|---|---|---|---|
| 2,391,493 | 12/1945 | Wainer et al. | 106/690 |
| 2,522,548 | 9/1950 | Streicher | 22/188 |
| 3,821,006 | 6/1974 | Schwartz | 106/85 |
| 3,960,580 | 6/1976 | Stierli et al. | 106/58 |
| 4,444,594 | 4/1984 | Paddison et al. | 106/105 |
| 4,756,762 | 7/1988 | Weill et al. | 106/121 |
| 4,786,328 | 11/1988 | Weill et al. | 106/85 |
| 5,518,541 | 5/1996 | Fogel et al. | 106/691 |
| 5,595,597 | 1/1997 | Fogel et al. | |
| 5,597,120 | 1/1997 | Chess, Jr. | 293/307 |
| 5,718,757 | 2/1998 | Guillou et al. | 106/690 |

FOREIGN PATENT DOCUMENTS

| | | |
|---|---|---|
| 593172 | 11/1947 | United Kingdom . |
| WO 96/35647 | 11/1996 | WIPO . |
| WO 97/34848 | 9/1997 | WIPO . |

OTHER PUBLICATIONS

Gregory, Ted. "Inventors struck on new compound." *Chicago Tribune*, p. E1–2: Nov. 5, 1997.

Wagh, A.S. et al. "Ceramicrete Stabilization of Low–Level Mixed Wastes—A Complete Story." *Proc. 18$^{th}$ U.S. DOE Low–Level Radioactive Waste Management Conference:* May 20–22, 1997.

*Primary Examiner*—Michael Marcheschi
*Attorney, Agent, or Firm*—Renner, Kenner Greive, Bobak Taylor & Weber

[57] ABSTRACT

A method for making a cementitious material comprises forming a mixture of water and active ingredients consisting essentially of i) a compound capable of providing, in aqueous solution, magnesium ions, ii) a potassium phosphate compound and iii) optionally an additional phosphate source; wherein forming said mixture is substantially in the absence of ammonia or an ammonium ion containing compound. A method for repairing a flaw in a cementitious structure comprises applying to the flaw the cementitious binder thus prepared.

32 Claims, No Drawings

RAPID SETTING, HIGH EARLY STRENGTH BINDERS

TECHNICAL FIELD

The present invention is directed to cementitious binders. More particularly, the present invention is directed to rapid setting, high early strength binders for use as cementitious repair materials, comprising phosphate cements.

BACKGROUND OF THE INVENTION

High early strength cementitious binders have been used in the past to repair cementitious structures, or as components of cementitious compositions to form structures. In one class of these materials, ammonium phosphates are used to prepare binder materials in reaction with magnesium ion-providing materials, such as MgO. International Patent Publication WO 96/35647 discloses a mechanism by which potassium struvite was prepared from an ammonium phosphate reactant. Some have proposed the use of other metal phosphates in conjunction with or as a replacement of ammonium phosphate, such as phosphate acid salts of Al, Ca, Mg or Na.

U.S. Pat. No. 2,522,548 discloses the production of refractory molds for metal casting made with phosphate binders produced from a metal oxide or hydroxide (Ca, Mg or Zn), a primary metal phosphate (Mg, Ca, Zn, Mn, Al or Fe), and a primary alkali metal phosphate (Na or K). The binder may be combined with fillers and retarders.

U.S. Pat. No. 4,444,594 discloses acid cured inorganic compositions suitable for a binder material compatible with mineral wool, for application in ceiling tiles. The binder is produced by reacting MgO, an acid phosphate, chloride or sulfate salt, an amino alcohol and water. Fillers can be added to the binder. The acid phosphate can be ammonium phosphate (preferred), sodium phosphate and potassium phosphate.

One problem encountered with the use of conventional repair binders or mortars, is that they usually contain ammonium phosphate hydrate as a component, for reaction with an alkaline earth oxide or hydroxide such as MgO or MgOH in water to form struvite. The reaction of the ammonium phosphate salt with the alkaline earth metal drives off ammonia as a gas, causing foaming and creating an unpleasant environmental odor. The use of such binders or cements indoors is severely limited.

A further problem with conventional materials is that the reaction between the alkaline earth metal ion and the ammonium phosphate salt is so fast, that the binder sets almost immediately, and limits the ability of the workman to "finish" the product in place. Setting retarders are therefore needed to permit working of the mixture to effectively treat the structure in need of repair.

SUMMARY OF THE INVENTION

It is therefore an object of the invention to provide a high early strength binder based on phosphate cement, which avoids the evolution of ammonia gas in its preparation.

It is a further object of the present invention to provide a high early strength binder that has a set time conducive to workability of the binder and finishing operations.

The present invention is directed to a process for preparing a cementitious binder useful in a high strength, quick setting mortar, whose utility includes a repair material for cementitious structures. The binding system is based on the formation of potassium struvite, by reacting a source of magnesium with potassium phosphate and water. Although still quick setting, the set time of this binder is slower than the set time of struvite. Inert fillers are included in mortars containing this material, and retarders may be included in the formulation to lengthen the workability time before set.

A significant advantage of the invention is the elimination of the conventionally used ammonia or ammonium ion containing materials that are used in the industry for quick setting mortars based on struvite. Avoidance of the evolution of ammonia in the use of the mortars greatly expands its applicability and use environment.

The present invention provides a method for making a cementitious material comprising:

forming a mixture of water and active ingredients consisting essentially of i) a compound capable of providing, in aqueous solution, magnesium ions, ii) a potassium phosphate compound, and iii) optionally an additional phosphate source;

wherein forming said mixture is substantially in the absence of ammonia or an ammonium ion containing compound. In one embodiment, the compound capable of providing magnesium ions is MgO, and the potassium phosphate compound is $KH_2PO_4$.

The present invention further provides a method for repairing a flaw in a cementitious structure, comprising applying to the flaw a cementitious binder prepared by forming a mixture of water and active ingredients consisting essentially of i) a compound capable of providing, in aqueous solution, magnesium ions, ii) a potassium phosphate compound, and iii) optionally an additional phosphate source;

wherein forming said mixture is substantially in the absence of ammonia or an ammonium ion containing compound.

In one embodiment, the cementitious binder of the present invention is formed in a mixture to prepare a mortar, wherein forming the mixture includes adding a substantially inert filler.

The present invention further provides a method for repairing a flaw in a cementitious structure, comprising applying to the flaw a mortar prepared by forming a mixture of an inert filler, water, and active ingredients consisting essentially of i) a compound capable of providing, in aqueous solution, magnesium ions, ii) a potassium phosphate compound, and iii) optionally an additional phosphate source;

wherein forming said mixture is substantially in the absence of ammonia or an ammonium ion containing compound.

DETAILED DESCRIPTION OF THE INVENTION

The present invention provides a method and binder formulations for preparing high strength, quick setting cementitious compositions, useful for concretes, flooring materials, grouts, and repair or patch materials for cementitious structures and the like. The method and compositions of the present invention are useful in construction materials that are mixed with water in close proximity to the place where they are to be cast or placed.

It is desirable that the materials of the present invention be used indoors, which limits the possible components of the formulation used to prepare them. For example, the ammonium ion containing formulations of the prior art that have been used as repair materials evolve ammonia gas during the water initiated reaction, and thus generally cannot be used indoors.

The present invention eliminates the generation of ammonia gas by providing a formulation and method that permits the formation of a high strength cementitious binder, substantially in the absence of ammonia or an ammonium ion containing compound.

The binding system of present invention is based on the formation of potassium struvite ($MgKPO_4.6H_2O$), by reacting a source of magnesium with a potassium phosphate compound such as $KH_2PO_4$ and water. The method includes forming a mixture of water and active ingredients consisting essentially of i) a compound capable of providing, in aqueous solution, magnesium ions, and ii) a potassium phosphate compound; wherein forming the mixture is substantially in the absence of ammonia or an ammonium ion containing compound. In a preferred embodiment, the compound capable of providing magnesium ions is MgO, and the potassium phosphate compound is $KH_2PO_4$.

Other sources of magnesium ions that can be used in the present method include but are not limited to magnesium hydroxide, magnesium phosphate hydrate, magnesium acetate, magnesium sulfate, magnesium thiosulfate, magnesium nitrite, magnesium thiocyanate, magnesium phosphate (monobasic), magnesium bromide, magnesium citrate, magnesium nitrate, and compatible mixtures thereof.

Based on active ingredients (i.e. magnesium source, potassium phosphate compound, retarder, additional phosphate source, and water), the formulation preferably contains about 10 to about 35 percent by weight of the magnesium source compound(s), preferably about 13 to about 30 percent by weight, and about 30 to about 60 percent by weight of the potassium phosphate compound, preferably about 30 to about 56 percent by weight. Water is generally added in an amount of about 15 to about 40 percent by weight, preferably about 16 to about 39 percent by weight, in order to initiate the reaction between the other components of the formulation.

The cementitious binder, thus prepared, can be used as a grout, or as a patch or repair material, by applying the binder, before setting, to the target surface.

Although still quick setting, the set time of this binder is slower than the set time of struvite. This permits the binder to be worked into a cast, mold, patch or other configuration while in a plastic state.

If desired, the set time can be further slowed by the optional addition of a retarder to the mixture, generally in the amount of up to 3 percent by weight. Examples of suitable retarders include, but are not limited to, oxy-boron compounds, polyphosphonic acid, salts of polyphosphonic acid, carboxylic acids, salts of carboxylic acids, polycarboxylic acids, salts of polycarboxylic acids, hydroxycarboxylic acids, salts of hydroxycarboxylic acids, alkali metal salts of halogens, nitrates, nitrites, or sulfates, alkali metal hydroxides, alkali metal carbonates, and mixtures thereof.

Further examples of suitable retarders for the inventive cementitious binder include, but are not limited to boric acid, alkali metal borates such as sodium borate, sodium tetraborate decahydrate, trialkoxyborates such as trimethylborate, triarylborates, nitrilotris(methylene) tris (phosphonic)acid and its pentasodium salt, citric acid, sodium citrate (monobasic or dibasic), trimellitic acid (hydrous), nitrilotriacetic acid trisodium salt (monohydrate), sodium chloride, potassium chloride, sodium silico-fluoride, sodium nitrate, potassium nitrate, sodium nitrite, potassium nitrite, sodium sulfate, potassium sulfate, sodium chloride, potassium chloride, sodium carbonate, potassium carbonate, and the like.

Other phosphate sources for the binder can optionally be utilized in addition to, or to replace a portion of, the potassium phosphate. The additional phosphate sources may further function as a dispersant for the binder and/or an accelerator for the reaction, and can contribute to strength development of the material. Examples of such phosphate sources include, but are not limited to, sodium tripolyphosphate, potassium tripolyphosphate, and sodium potassium tripolyphosphate. The additional phosphate source can be added to the other active ingredients in the mixture in an amount of up to about 20 percent by weight, preferably up to about 15% by weight.

Examples of the present inventive cementitious binder and method were conducted in comparison to prior art ammonium ion containing formulations. A magnesium source, phosphate source, water and optionally a retarder were mixed, placed in a mold and allowed to set. Specific binder mixture components and their amounts, are set forth in Table 1 below.

TABLE 1

| Example | Binder Mixture Formulation |
|---------|---------------------------|
| C1. | MgO(38%) - $NH_4H_2PO_4$(43%) - $H_2O$(19%) |
| 2. | MgO(28%) - $KH_2PO_4$(55%) - $H_2O$(17%) |
| C3. | MgO(33%) - $NH_4H_2PO_4$(32%) - $K_2CO_3$(18%) - $H_2O$(17%) |
| C4. | MgO(39%) - $NH_4H_2PO_4$(44%) - $H_2O$(17%) |
| 5. | MgO(28%) - $KH_2PO_4$(55%) - $H_2O$(17%) |
| C6. | MgO(33%) - $NH_4H_2PO_4$(32%) - $K_2CO_3$(18%) - $H_2O$(17%) |
| C7. | MgO(39%) - $NH_4H_2PO_4$(44%) - $H_2O$(17%) |
| 8. | MgO(28%) - $KH_2PO_4$(55%) - $H_2O$(17%) |
| C9. | MgO(33%) - $NH_4H_2PO_4$(32%) - $K_2CO_3$(18%) - $H_2O$(17%) |

Mixes 4–6 contained 0.2 wt. % boric acid.

Mixes 7–9 contained 0.5 wt. % boric acid.

The fluidity of the initial mixtures was evaluated, the setting times measured using the Vicat apparatus described in ASTM C-191, and the compressive strengths of the molded articles tested after 24 hours as described in ASTM C-109. Results are set forth in Table 2, below.

TABLE 2

| Example | Fluidity | Setting time (minutes) | 24 hour compressive strength (MPa) |
|---------|----------|------------------------|-------------------------------------|
| C1. | very fluid | 5 | not measured-specimens damaged during setting |
| 2. | workable | 12 | 7.6 |
| C3. | fluid | 6 | not measured - specimens damaged during setting |
| C4. | workable | 6 | 1.9 |
| 5. | workable | 26 | 6.7 |
| C6. | workable | 12 | not measured - specimens damaged during setting |
| C7. | workable | 7 | 6.4 |
| 8. | workable | 47 | 6.5 |
| C9. | fluid | 15 | not measured - specimens damaged during setting |

Comparative Examples 1, 4 and 7 evolved large amounts of ammonia gas upon setting, such that the strength specimens expanded out of their molds. Comparative Examples 3, 6 and 9 evolved ammonia gas during mixing, and for several minutes after the strength specimens were cast. This caused the material to flow out of the molds and then to shrink back, resulting in half-formed cubes of high porosity.

The majority of the comparative samples were damaged by the gas evolution during their rapid set, such that the 24 hour compressive strength test could not be carried out on them.

These problems were not encountered with the binders of the Examples of the present invention, which set more slowly than the comparative materials though still quite rapidly, in less than about three quarters of an hour. The 24 hour compressive strength of all the samples of the present invention were equivalent to or better than the best of the comparative samples that survived to testing.

A second series of tests were carried out as described above, to compare Examples of the present invention with prior art cementitious binders. In these tests, the amount of retarder was varied in order to attempt to match setting times for the different formulations. The binder formulations are set forth in Table 3 below.

TABLE 3

| Example | Binder Mixture Formulation |
|---|---|
| C10. | $MgO(38\%)$ - $NH_4H_2PO_4(43\%)$ - $H_2O(15\%)$ + boric acid (4%) |
| 11. | $MgO(29\%)$ - $KH_2PO_4(55\%)$ - $H_2O(16\%)$ |
| C12. | $MgO(33\%)$ - $NH_4H_2PO_4(31\%)$ - $K_2CO_3(18\%)$ - $H_2O(15\%)$ + boric acid (2.5%) |
| 13 | $MgO(28\%)$ - $KH_2PO_4(55\%)$ - $H_2O(16\%)$ + boric acid(0.3%) |
| 14. | $MgO(28\%)$ - $KH_2PO_4(55\%)$ - $H_2O(16\%)$ + boric acid (0.5%) |
| C15. | $MgO(37\%)$ - $NH_4H_2PO_4(41\%)$ - $H_2O(14\%)$ + boric acid (8%) |
| C16. | $MgO(35\%)$ - $NH_4H_2PO_4(39\%)$ - $H_2O(14\%)$ + boric acid (12.5%) |
| C17. | $MgO(34\%)$ - $NH_4H_2PO_4(32\%)$ - $K_2CO_3(18\%)$ - $H_2O(15\%)$ + boric acid (0.5%) |
| C18. | $MgO(34\%)$ - $NH_4H_2PO_4(32\%)$ - $K_2CO_3(18\%)$ - $H_2O(15\%)$ + boric acid (1%) |

Again, the fluidity of the initial mixtures were evaluated, the setting times measured, and the compressive strengths of the molded articles tested after 24 hours. Results of the tests are set forth in Table 4, below.

TABLE 4

| Example | Fluidity | Setting time (minutes) | 24 hour compressive strength (MPa) |
|---|---|---|---|
| C10. | workable | 17 | 10.9 |
| 11. | workable | 16 | 10.9 |
| C12. | fluid | 58 | 30.3 |
| 13. | workable | 44 | 5.1 |
| 14. | workable | 44 | 5.2 |
| C15. | workable | 29 | 19.6 |
| C16. | workable | 41 | 20.7 |
| C17. | workable | 25 | 52.6 |
| C18. | fluid | 22 | 19.4 |

Comparative Examples 10, 15 and 16 evolved large amounts of ammonia gas upon setting, such that the strength specimens expanded out of their molds.

In Comparative Example 12, the $NH_4H_2PO_4$, water, and $K_2CO_3$ were allowed to interact for more than 30 minutes, such that gas evolution could occur before MgO and boric acid were added; gas was still evolved during the setting process, making preparation of specimens for strength testing difficult.

In Comparative Example 17, the $K_2CO_3$ was ground to less that 500 microns, then $NH_4H_2PO_4$, water, and $K_2CO_3$ were allowed to interact for about 30 minutes, such that gas evolution could occur before MgO and boric acid were added.

In Comparative Example 18, the $K_2CO_3$ was dissolved in the mix water, then $NH_4H_2PO_4$, water, and $K_2CO_3$ were allowed to interact for more than 30 minutes, such that gas evolution could occur before MgO and boric acid were added; gas was still evolved during the setting process, making preparation of specimens for strength testing difficult.

The problems associated with the evolution of ammonia gas were avoided in the Examples of the present invention, and acceptable setting times and compressive strengths were achieved.

The inventive cementitious binder is useful in mortar formulations which include substantially inert fillers, including but not limited to silica sand, Class F fly ash, talc, clay based sand, silica fume and mixtures thereof.

The inert filler may be added to the cementitious binder in an amount of about 60% to about 85%, preferably about 70% to about 80% based on the total weight of the resulting mortar to achieve the inventive mortar composition.

Cementitious mortars were prepared according to the method of the present invention and tested for initial set time, and both 24 hour and 7 day compressive strength. The formulations and test results are set forth below as Examples 19 through 24.

Example 19

| | |
|---|---|
| Reactive powder | 553 g |
| (29% MgO, 60% $KH_2PO_4$, 11% sodium tripolyphosphate): | |
| Fly ash: | 392 g |
| Silica sand: | 2354 g |
| Water | 345 mL |

Initial set time=18 minutes 24 hour compressive strength=28.0 Mpa 7 day compressive strength=29.8 Mpa Example 20

| | |
|---|---|
| Reactive powder | 553 g |
| (21.8% MgO, 72% $KH_2PO_4$, 0.9% boric acid, 5.3% sodium tripolyphosphate): | |
| Fly ash: | 392 g |
| Silica sand: | 2354 g |
| Water | 345 mL |

Initial set time=38 minutes 24 hour compressive strength=14.2 Mpa 7 day compressive strength=25.5 Mpa Example 21

| | |
|---|---|
| Reactive powder | 553 g |
| (45% MgO, 55% $KH_2PO_4$): | |
| Fly ash: | 392 g |
| Silica sand: | 2354 g |
| Water | 345 mL |

Initial set time=24 minutes 24 hour compressive strength=21.9 Mpa 7 day compressive strength=22.0 Mpa

Example 22

| | |
|---|---|
| Reactive powder (45% MgO, 50% KH$_2$PO$_4$, 5% sodium tripolyphosphate): | 553 g |
| Fly ash: | 392 g |
| Silica sand: | 2354 g |
| Water | 345 mL |

Initial set time=14 minutes 24 hour compressive strength=19.2 Mpa 7 day compressive strength=25.1 Mpa

Example 23

| | |
|---|---|
| Reactive powder (33.2% MgO, 50% KH$_2$PO$_4$, 3.5% boric acid, 13.3% sodium tripolyphosphate): | 553 g |
| Fly ash: | 392 g |
| Silica sand: | 2354 g |
| Water | 345 mL |

Initial set time=37 minutes 24 hour compressive strength=24.7 Mpa 7 day compressive strength=35.1 Mpa

Example 24

| | |
|---|---|
| Reactive powder (21.5% MgO, 50% KH$_2$PO$_4$, 3.5% boric acid, 25% sodium tripolyphosphate): | 553 g |
| Fly ash: | 392 g |
| Silica sand: | 2354 g |
| Water | 345 mL |

Initial set time=89 minutes 24 hour compressive strength=4.1 Mpa 7 day compressive strength=14.7 Mpa The mortar of the present invention provides similar properties to mortars that are bound by struvite, namely quick setting, high early strength, volume stability and excellent bond to most substrates. The potassium struvite mortar of the present invention eliminates, however, the evolution of ammonia gas as a reaction by-product, results in a desirably slower, yet still rapid setting, and results in a lower heat evolution upon setting. These advantages permit the mortar to be used indoors, coated with a coating, and finished in place.

The cementitious composition mixtures of the present invention as described above may be formulated in dry form, to be activated by the introduction of water to the mixture. Accordingly, such a cementitious composition formulation would preferably comprise active ingredients consisting essentially of i) a compound capable of providing, in aqueous solution, magnesium ions, ii) a potassium phosphate compound, and iii) optionally an additional phosphate source; in which said mixture ammonia or an ammonium ion containing compound is substantially absent. The active ingredients are preferably present in an amount of about 10 to about 35 parts of the magnesium ion providing compound, about 30 to about 60 parts of the potassium phosphate compound, and up to about 20 parts of the additional phosphate source. The formulation may further comprise a substantially inert filler, and optionally, a retarder.

Thus it is demonstrated that the objects of the present invention are met. The examples included above are for illustrative purposes only and the present invention is not to be limited to them. It is to be understood that other active ingredients, fillers, retarders, dispersants, accelerators and other admixtures and the like can be included in the cementitious materials of the present invention, without departing from the spirit of the invention herein disclosed and described. Thus, the scope of the invention shall include all modifications and variations that may fall within the scope of the attached claims and equivalent embodiments.

What is claimed is:

1. A method for making a cementitious material comprising:

forming a mixture of water and active ingredients consisting essentially of i) a magnesium compound capable of providing, in aqueous solution, magnesium ions, ii) a potassium phosphate compound capable of providing phosphorous pentoxide, wherein the weight ratio of the magnesium compound to the phosphorous pentoxide from the potassium phosphate compound is from about 0.25 to less than 1, iii) optionally an additional phosphate source; and iv) optionally a retarder; wherein forming said mixture is in the absence of ammonia or an ammonium ion containing compound.

2. The method of claim 1 wherein said compound capable of providing magnesium ions is MgO, and said potassium phosphate compound is KH$_2$PO$_4$.

3. The method of claim 1 wherein forming the mixture includes adding an inert filler.

4. The method of claim 3 wherein the inert filler is selected from the group consisting of silica sand, Class F fly ash, talc, clay based sand, silica fume and mixtures thereof.

5. The method of claim 4 wherein said compound capable of providing magnesium ions is MgO, and said potassium phosphate compound is KH$_2$PO$_4$.

6. The method of claim 1 wherein forming the mixture includes adding a retarder.

7. The method of claim 6 wherein the retarder is selected from the group consisting of an oxy-boron compound, a polyphosphonic acid, a salt of a polyphosphonic acid, a carboxylic acid, a salt of a carboxylic acid, a polycarboxylic acid, a salt of a polycarboxylic acid, a hydroxycarboxylic acid, a salt of a hydroxycarboxylic acid, and mixtures thereof.

8. The method of claim 6, wherein the retarder is present in an amount of up to about 3 percent by weight based on the weight of the water and the active ingredients.

9. The method of claim 3 wherein the inert filler is present in the mixture in the amount of about 60 to about 85 percent based on the total weight of the mixture.

10. The method of claim 1, wherein the active ingredients are present in the amount of about 10 to about 15 parts by weight of the magnesium ion providing compound, about 30 to about 60 parts by weight of the potassium phosphate compound, based on the weight of the water and active ingredients.

11. The method of claim 1 wherein water is present in the mixture in an amount of about 15 to about 40 percent by weight, based on the weight of the weight of the water and the active ingredients.

12. The method of claim 1, wherein the additional phosphate source is selected from the group consisting of sodium tripolyphosphate, potassium tripolyphosphate, sodium potassium tripolyphosphate and mixtures thereof.

13. The method of claim 1 wherein the additional phosphate source is present in the mixture in an amount of up to about 20 percent by weight, based on the weight of the weight of the water and the active ingredients.

14. A cementitious binder prepared by the method of claim 1.

15. A mortar prepared by the method of claim 3.

16. The mortar of claim 15, containing a retarder selected from the group consisting of an oxy-boron compound, a polyphosphonic acid, a salt of a polyphosphonic acid, a carboxylic acid, a salt of a carboxylic acid, a polycarboxylic acid, a salt of a polycarboxylic acid, a hydroxycarboxylic acid, a salt of a hydroxycarboxylic acid, and mixtures thereof.

17. A method for repairing a flaw in a cementitious structure, comprising applying to the flaw a mortar prepared by forming a mixture of an inert filler, water and active ingredients consisting essentially of i) a magnesium compound capable of providing, in aqueous solution, magnesium ions, ii) a potassium phosphate compound capable of providing phosphorous pentoxide, wherein the weight ratio of the magnesium compound to the phosphorous pentoxide from the potassium phosphate compound is from about 0.25 to less than 1, iii) optionally an additional phosphate source; and iv) optionally a retarder; wherein forming said mixture is in the absence of ammonia or an ammonium ion containing compound.

18. The method of claim 17 wherein the inert filler is selected from the group consisting of silica sand, Class F fly ash, talc, clay based sand, silica fume and mixtures thereof.

19. The method of claim 17 wherein said compound capable of providing magnesium ions is MgO, and said potassium phosphate compound is $KH_2PO_4$.

20. The method of claim 17 wherein forming the mixture includes adding a retarder.

21. The method of claim 20 wherein the retarder is selected from the group consisting of an oxy-boron compound, a polyphosphonic acid, a salt of a polyphosphonic acid, a carboxylic acid, a salt of a carboxylic acid, a polycarboxylic acid, a salt of a polycarboxylic acid, a hydroxycarboxylic acid, a salt of a hydroxycarboxylic acid, and mixtures thereof.

22. The method of claim 17, wherein the additional phosphate source is selected from the group consisting of sodium tripolyphosphate, potassium tripolyphosphate, sodium potassium tripolyphosphate and mixtures thereof.

23. A method for repairing a flaw in a cementitious structure, comprising applying to the flaw a cementitious binder prepared by forming a mixture of water and active ingredients consisting essentially of i) a magnesium compound capable of providing, in aqueous solution, magnesium ions, ii) a potassium phosphate compound capable of providing phosphorous pentoxide, wherein the weight ratio of the magnesium compound to the phosphorous pentoxide from the potassium phosphate compound is from about 0.25 to less than 1, iii) optionally an additional phosphate source; and iv) optionally a retarder; wherein forming said mixture is in the absence of ammonia or an ammonium ion containing compound.

24. The method of claim 23 wherein said compound capable of providing magnesium ions is MgO, and said potassium phosphate compound is $KH_2PO_4$.

25. The method of claim 23 wherein forming the mixture includes adding a retarder.

26. The method of claim 25 wherein the retarder is selected from the group consisting of an oxy-boron compound, a polyphosphonic acid, a salt of a polyphosphonic acid, a carboxylic acid, a salt of a carboxylic acid, a polycarboxylic acid, a salt of a polycarboxylic acid, a hydroxycarboxylic acid, a salt of a hydroxycarboxylic acid, and mixtures thereof.

27. The method of claim 23, wherein the additional phosphate source is selected from the group consisting of sodium tripolyphosphate, potassium tripolyphosphate, sodium potassium tripolyphosphate and mixtures thereof.

28. A cementitious composition formulation comprising active ingredients to which water is to be added consisting essentially of i) a magnesium compound capable of providing, in aqueous solution, magnesium ions, ii) a potassium phosphate compound capable of providing phosphorous pentoxide, wherein the weight ratio of the magnesium compound to the phosphorous pentoxide from the potassium phosphate compound is from about 0.25 to less than 1, iii) optionally an additional phosphate source; and iv) optionally a retarder; wherein said formulation does not contain ammonia or an ammonium ion containing compound and; wherein the active ingredients are present in an amount of about 10 to about 15 parts by weight of the magnesium ion providing compound, about 30 to about 60 parts by weight of the potassium phosphate compound, and up to about 20 parts by weight of the additional phosphate source.

29. The formulation of claim 28 further comprising an inert filler.

30. The formulation of claim 28 comprising a retarder.

31. A cementitious binder prepared by the method of claim 2.

32. A mortar prepared by the method of claim 5.

* * * * *